US006032037A

United States Patent [19]

Jeffers

[11] Patent Number: 6,032,037

[45] Date of Patent: Feb. 29, 2000

[54] ALARM PANEL WITH CELLULAR COMMUNICATIONS BACKUP

[75] Inventor: John Michael Jeffers, Newmarket, Canada

[73] Assignee: Sur-Gard Security Systems Ltd.

[21] Appl. No.: 08/991,772

[22] Filed: Dec. 16, 1997

[51] Int. Cl.[7] .......................... H04M 11/00; H04M 1/66; H04M 1/68; H04M 3/16

[52] U.S. Cl. .......................... 455/404; 455/410; 455/411

[58] Field of Search .................................... 455/404, 410, 455/411, 574, 38.3

[56] References Cited

U.S. PATENT DOCUMENTS

| | | | |
|---|---|---|---|
| 4,559,526 | 12/1985 | Tani et al. | 455/404 |
| 4,993,059 | 2/1991 | Smith et al. | 455/404 |
| 5,185,779 | 2/1993 | Dop et al. | 455/404 |
| 5,517,547 | 5/1996 | Ladha et al. | 455/404 |
| 5,806,007 | 9/1998 | Raith et al. | 455/574 |
| 5,809,123 | 9/1998 | Reynolds | 455/411 |

*Primary Examiner*—Dwayne D. Bost
*Assistant Examiner*—Raymond B. Persino

[57] ABSTRACT

An alarm panel of a security system communicates with a remote monitoring arrangement using a cellular communication protocol which deports from the conventional AMPS protocol and is less vulnerable to fraudulent activities. The modified protocol reduces transmissions from the cellular arrangement to the cell site by ignoring query signals. The cellular arrangement continues to monitor received cellular transmissions to provide an assessment of the ability to respond.

8 Claims, 1 Drawing Sheet

ALARM PANEL WITH CELLULAR COMMUNICATIONS BACKUP

FIELD OF THE INVENTION

The present invention relates to alarm panels with a cellular communication capability and in particular, relates to an arrangement and a communication protocol which reduces the potential for fraudulent detection of the cellular number.

BACKGROUND OF THE INVENTION

There are a number of existing alarm panels for a security system, which either use a cellular communication arrangement as their primary or secondary communication to report alarm conditions detected by the alarm panel to a monitoring station. Cellular backup is advantageous as the equipment is designed to operate on batteries and it can provide communication in situations where conventional land lines are not always reliable. For the above reasons and others, a cellular backup arrangement has proven quite popular.

Cellular systems in general have been prone to fraudulent activities where transmissions are monitored and analyzed to extract information from the signal which information is used to complete unauthorized cellular transmissions. Basically, the signals are analyzed to identify the cellular address and codes which can then be incorporated in a fraudulent cellular device and used for a certain period of time before discovery. It is often possible to place fraudulent communications costing in excess of $20,000.00 before discovery.

Alarm panels with cellular backup are even more prone to monitoring as their location is fixed and thus, monitoring is extremely easy. Therefore, although cellular backup provides a desirable advantage, it also has certain disadvantages. These disadvantages are associated with the analog cellular systems and the accepted operations standard of the AMPS system for cellular communication.

According to the accepted AMPS standard, a cellular device operates in either a power off mode, an active mode or a standby mode. During the power off mode, the transmitter and the receiver of the cellular device is off. During the active mode and the standby mode, the receiver and transmitter are both active and the cellular device upon being powered, registers with a cell site and responds to received query signals from the cell site. These communications are conventional cellular communication to the cell site and could be monitored. Thus, using the accepted AMPS protocol, there are a number of ongoing transmissions between the cellular device and the cell site which can be fraudulently monitored for theft of the cellular authorization parameters. To overcome these problems, the alarm panel maintains the cellular capability thereof in the power off mode. Unfortunately, this does not provide for a high degree of confidence that the cellular capability would be available if needed.

The present invention seeks to overcome these disadvantages while providing an assessment of the availability of the cellular communication arrangement.

SUMMARY OF THE INVENTION

A communication protocol according to the present invention for an alarm panel having a cellular transmission arrangement comprises the steps of registering the cellular transmission arrangement with a cell site using two way communication between the cellular transmission arrangement of the cell site, causing a transmitter of the cellular transmission arrangement to assume a sleep mode state, using a receiver of the cellular transmission arrangement to monitor cellular signals and make ongoing assessments of the operation status of the cellular transmission arrangement, ignoring any query signals from the cell site requesting to report in and in the event of a negative assessment for a specified period of time, using the cellular transmission arrangement to register with the cell site using the cellular transmission arrangement.

An alarm panel of a security system according to the present invention comprises input means for receiving signals from a plurality of sensors and processing means for processing the signals and determining whether an alarm condition exists. The alarm panels includes a communication arrangement for communicating with a remote monitoring station using at least two communication transmission protocols. One of the communication transmission protocols includes using a cellular transmission protocol. The cellular communication protocol has a normal communication state for reporting alarm conditions and a ready assessment state for providing an assessment of whether the cellular capability of the communication arrangement is ready to operate. The ready assessment state includes means for sending a cellular communication to a cell site to register therewith on an infrequent basis and means for monitoring cellular communications in general to provide an indication that the cellular capability is operative. The alarm panel determines that a potential problem of the cellular capability when received transmissions fail to satisfy a predetermined level. The communication arrangement ignores query signals from the cell site requesting the cellular communication arrangement to report.

With this arrangement, the receiver portion of the cellular communication arrangement remains active and provides an indication of the integrity of the antennae and the integrity of the communication arrangement at least with respect to receipt of cellular communication. This assessment provides a basis for predicting whether the transmission capability is operative. The transmission capability uses the same antennae and part of the feed to the antennae used by the receiver and thus it is reasonable to make this prediction. Furthermore, the antennae portion of the cellular communication arrangement is perhaps the most vulnerable component and attempts to defeat the system causes a deterioration in the receive signals.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
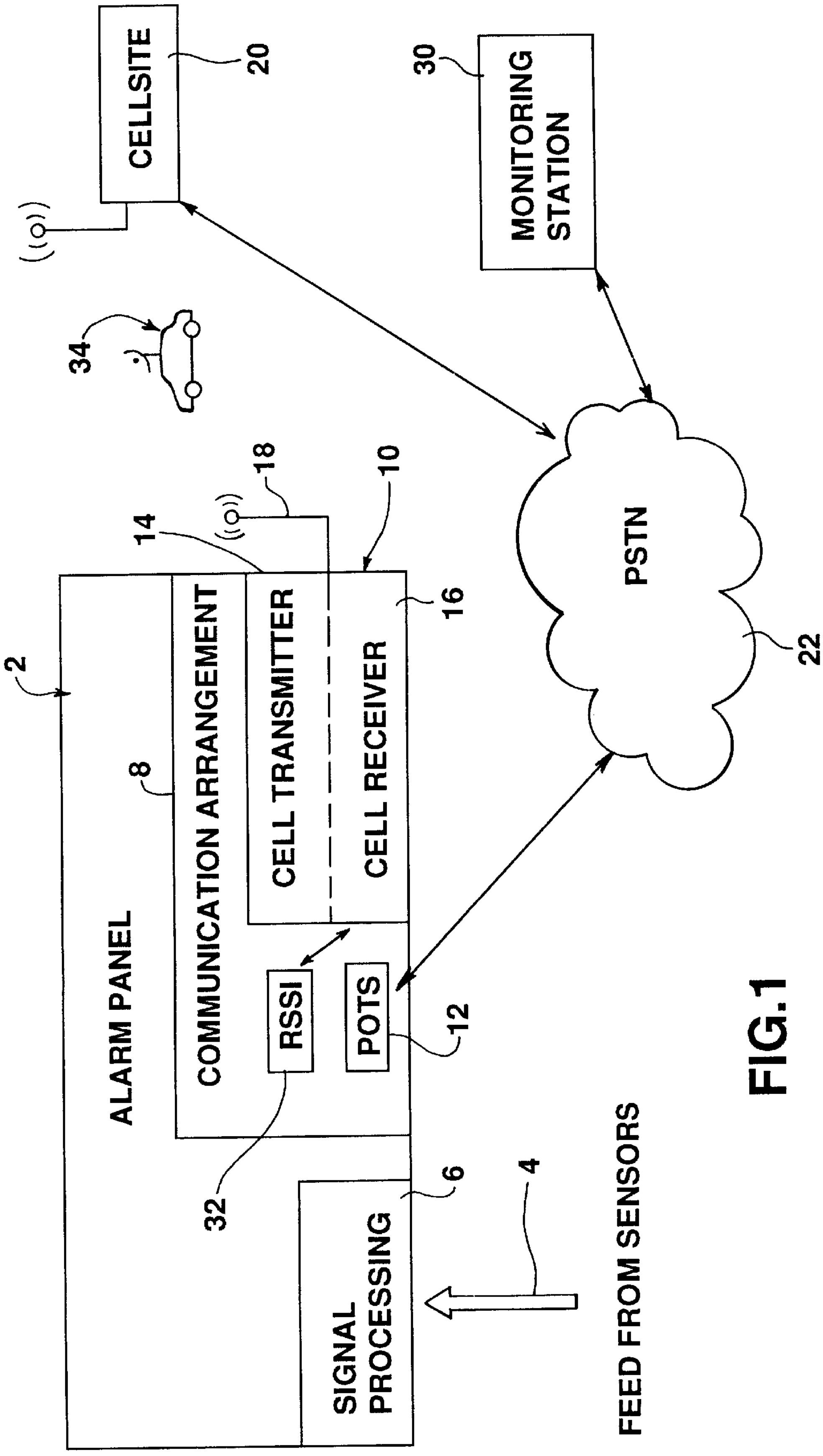
FIG. 1 of the drawings shows a schematic of the operating system.

The alarm panel 2 receives signals from the sensors along the feed 4 and processes these signals using the signal processing unit 6 to determine various alarm conditions or other events to be reported to a monitoring station 30. The monitoring station 30 is located at a remote location and the communication therewith can take many forms. The alarm panel 2 includes a communication arrangement 8 which is shown as having a cellular capability 10 and a POTS capability 12 of which communicates with the monitoring station over the land based telephone system through the PST end 22.

The cellular unit 10 includes an antennae 18 for receiving signals from the cell site 20 and for transmitting signals to the cell site 20.

The cellular unit 10 communicates with the cell site 20 using the cellular technology referred to as AMPS. This standard basically includes three modes: a power off mode, an active mode, and a standby mode. In the power off mode, the cellular device, such as the cellular device 10, can not register with the cell site 20 and does not respond to query signals from the cell site 20. Generally, there would be no query signals as the cell site would not know that the cellular device is in the area. In the active mode, the first step is for the cellular device to register with the cell site and then effect normal communication. In the standby mode, the cell device is basically standing by and does receive signals from time to time from the cell site 20. Some of these signals are specifically addressed to the cellular device and are query signals causing the cellular device to report to the cell site. The normal standard is for a cellular device to receive these query signals approximately every 12 minutes during the day and approximately one per hour at night. Thus, it can be appreciated that in the standby mode and in the active mode, using the conventional protocol, that there are a host of signals being transmitted between the cellular device 10 and the cell site 20. Furthermore, it can be understood that the alarm panel 2 is stationary and it is easy for these signals to be intercepted. It is somewhat more difficult to intercept conventional cellular signals as the location where the signal is being generated is changing, i.e. the cell devices moving about the territory and often being transferred from cell site to cell site. With the fixed location, the signals can be received and analyzed by what is referred to as a "sniffier" 34 and over time, it is possible to distract the pertinent information necessary for authorizing the cellular communication. With this particular information, it is possible to load it into a fraudulent cellular device whereby communications from the fraudulent device are accepted by the cell site and the fraudulent activity is not discovered for some time. For this reason, often alarm panels 2 do not operate the cellular device in either the standby mode or the active mode. Basically, the cellular device is merely sitting there in a power off mode and it is assumed that it will operate satisfactory when required. Should any criminal activity occur, such as sabotage to the antennae or attempts to shield the antenna, these basically go undetected until the device is turned on. This leaves the cellular backup capability prone to sabotage.

With the present invention, the cellular device 10 uses a modified protocol to overcome the above problem. In particular, the cellular device operates in a quasi standby mode where the transmitter is basically off and the receiver continues to monitor cellular transmissions. The strength of the signal being received is assessed and a judgment is made whether the integrity of the unit is intact based on the received signal strength. The cellular unit includes a received signal strength indicator (RSSI) 32 which provides an assessment of the signal being received by the cellular unit. If the value of the RSSI falls below a certain level for a certain period of time, the cellular unit can be programmed to register with the cell site. If it is unable to register with the cell site, the alarm panel can communicate the trouble condition to the monitoring station 30 using the POTS capability 12. If the cellular unit is successful in registering, it can return to the monitoring mode following its decision logic not to respond to query signals from the cell site. It has been found that if the RSSI level falls below approximately 115 dbm for more than a five second period, the cellular unit can attempt to register with the cell site. It is also possible to have a cellular unit have a fixed number of attempts to register with the cell site before continuing or merely continue to attempt to register with the cell site.

From the above, it can be appreciated that the cellular unit 10 is using the receiver of the cellular unit to provide an assessment of the operation capability of the cellular device. The confirming ability to transmit is only exercised on a much more infrequent basis such as once a day but it still provides confirmation that the device is fully operative. It has been found that there is a very good probability that the cellular unit can appropriately transmit, given that the receiver is operating in its normal mode and the cellular unit is basically tracking its performance.

From the above it can be appreciated that other assessments of the signal strength or the received signal at the cellular unit can be carried out for the assessment. In particular, it is possible to look to the cellular data ratio (data to noise/noise).

With this arrangement it can be seen that the cellular unit 10, although it has a fixed location, is less prone to fraudulent monitoring in that the number of signals being sent from the cellular device to the cell site is reduced. The arrangement also provides a reasonable assessment of the operating capability of the cell unit in that the receiving part of the cell unit is monitored continuously and the transmit part of the cell unit is checked from time to time. It is also possible to provide internal checks on the transmitter without sending the signal to the antennae 18, if further confirmation is desired.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A communication protocol for an alarm panel having a cellular transmission arrangement comprising the steps of registering the cellular transmission arrangement with a cell site by using two way communication between said cellular transmission arrangement and said cell site, causing a transmitter of said cellular transmission arrangement to assume a sleep mode state, using a receiver of said cellular transmission arrangement to monitor cellular signals and make ongoing assessments of the operation status of said cellular transmission arrangement, ignore any query signals from the cell site, and in the event of a negative assessment for a specified period of time said cellular transmission arrangement attempting to register with said cell site using a cellular transmission arrangement.

2. A communication arrangement as claimed in claim 1 wherein said receiver makes ongoing assessments of the operation status of said cellular transmission arrangement by comparing said monitored cellular signals to a Received Signal Strength Indicator level and providing a positive assessment when said monitored cellular signals exceed said Received Signal Strength Indicator level and a negative assessment if said monitored cellular signals fall below said Received Signal Strength Indicator level.

3. An alarm panel of a security system comprising input means for receiving signals from a plurality of sensors and processing means for processing said signals and determining whether an alarm condition exists, said alarm panel including a communication arrangement for communicating with a remote monitoring station using at least two communication transmission protocols, one of said communication transmission protocols including cellular transmission protocol, said cellular communication protocol having a normal communication state for reporting alarm conditions and a ready assessment state for providing an assessment of whether the cellular capability of the communication arrangement is ready to operate, said ready assessment state including means for sending a cellular communication to a cell site to register therewith on an infrequent basis to reduce the transmissions therebetween, and means for monitoring cellular communications in general to provide an indication that the cellular capability is operative, said alarm panel determining a potential problem of said cellular capability when received transmissions fail to satisfy a predetermined level, said cellular communication arrangement ignoring cell site signals requesting to report.

4. An alarm panel as claimed in claim 3 wherein said means for monitoring cellular communications includes a Received Signal Strength Indicator and said predetermined level is compared to the results of said Received Signal Strength Indicator.

5. An alarm panel as claimed in claim 4 wherein said predetermined level is a predetermined level for a fixed period of time.

6. An alarm panel as claimed in claim 5 wherein said fixed period is less than 15 seconds.

7. An alarm panel as claimed in claim 5 wherein said fixed period is less than 5 seconds.

8. An alarm panel as claimed in claim 3 wherein said communication arrangement sends a cellular communication signal to register with a cell site generally on a daily basis.

* * * * *